United States Patent
Miyamura

(10) Patent No.: US 7,483,651 B2
(45) Date of Patent: Jan. 27, 2009

(54) DRIVE DEVICE USED IN IMAGE FORMING DEVICE

(75) Inventor: Hiroaki Miyamura, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 165 days.

(21) Appl. No.: 11/641,760

(22) Filed: Dec. 20, 2006

(65) Prior Publication Data

US 2007/0155569 A1  Jul. 5, 2007

(30) Foreign Application Priority Data

Dec. 21, 2005 (JP) ............................. 2005-368480
Dec. 21, 2005 (JP) ............................. 2005-368482

(51) Int. Cl.
 *G03G 15/00* (2006.01)
(52) U.S. Cl. ..................................................... 399/167
(58) Field of Classification Search ................. 399/130, 399/159, 167; 475/149; 74/574.4
See application file for complete search history.

(56) References Cited

U.S. PATENT DOCUMENTS 7,294,080 B2 * 11/2007 Hoshino .................... 475/149

FOREIGN PATENT DOCUMENTS

| JP | 2002-171779 | | 6/2002 |
|---|---|---|---|
| JP | 2007-264406 | * | 10/2007 |
| JP | 2007-267536 | * | 10/2007 |
| JP | 2007-271858 | * | 10/2007 |

* cited by examiner

*Primary Examiner*—Hoan H Tran
(74) *Attorney, Agent, or Firm*—Global IP Counselors, LLP

(57) ABSTRACT

A drive device 1 includes a motor 2, a planetary roller type power transmission unit and a drive control unit. The planetary roller type power transmission unit includes a plurality of planetary rollers 4, a ring 6, a fixed body 9 covering the ring 6 and having an aperture 9a located so that a projecting portion 6a is movable therein, a carrier roller 7, and an output shaft 8. A drive control unit 10 controls the rotation of a motor 2 of the drive device so that when the image forming device is not carrying out an image forming operation the projecting portion 6a of the ring 6 reciprocates within the aperture 9a of the fixed body 9.

15 Claims, 12 Drawing Sheets

Reciprocating Time Table

| Temperature Range (°C) (Te; Temperature From Temperature Sensor) | Reciprocating Time Ts (sec) |
|---|---|
| Te<0 | Ts=22 |
| 0≦Te<20 | Ts=10+(20−Te)/2.89 |
| 20≦Te | Ts=10 |

Fig. 10

DRIVE DEVICE USED IN IMAGE FORMING DEVICE

CROSS-REFERENCE TO RELATED APPLICATIONS

This application claims priority to Japanese Patent Application Nos. 2005-368480 and 2005-368482 filed on Dec. 21, 2005. The entire disclosures of Japanese Patent Application Nos. 2005-368480 and 2005-368482 are hereby incorporated herein by reference.

BACKGROUND OF THE INVENTION

1. Field of the Invention

The present invention generally relates to a drive device. More specifically, the present invention relates to a drive device used in an image forming device.

2. Background Information

Image forming devices such as color printers, color copiers, and the like, have rotation drive devices to rotate and to drive image forming unit, e.g. photosensitive drums for each color component, transfer belts, and so on. Some rotation drive devices include a motor and a planetary speed reduction device to reduce the speed of the motor.

In recent years, with the reduction in cost of image forming devices there is a tendency to form at least part of the planetary rollers in the planetary speed reduction device using an elastic material such as, for example, rubber. Elastic deformations are produced in planetary rollers made from an elastic material because the planetary rollers are pressed against the output shaft to transmit the rotation of the motor to the outside. The elastic deformations of the elastic material of the planetary rollers cause a change in the rotation speed of the output shaft of the speed reduction device. Furthermore, color distortion, color unevenness, and the like appears in the images produced when the rotation speed of the output shaft of the speed reduction device fluctuates.

In Japanese Patent Application Laid-open No. 2002-171779, a rotation drive device is disclosed in which when an elastic material is used in the planetary rollers, the rotation speed of the motor is directly controlled to obtain a uniform rotation speed of the output shaft. Specifically, the rotation drive device of Japanese Patent Application Laid-open No. 2002-171779 includes a stepping motor, an elastic material speed reduction device, and a feedback control unit. The elastic material speed reduction device includes a torque transmission unit that transmits torque by frictional contact of the elastic material, and does not include a torque transmission unit that uses gears. The elastic material speed reduction device reduces the rotation speed of the motor and outputs the rotation speed to the photosensitive drum. The feedback control unit measures the output rotation speed of the elastic material speed reduction device, obtains the difference from the standard speed, and applies a speed command signal to the motor based on the value of the difference so that the rotation speed of the motor is directly controlled.

However, the device of Japanese Patent Application Laid-open No. 2002-171779 has the following problem points.

The elastic deformation occurs in the elastic material of the planetary rollers during the time that motor rotation has stopped until the motor is driven again. This deformation causes unevenness in the rotation speed of the output shaft of the speed reduction device for a while after starting to drive again. The period of time that the rotation speed of the output shaft of the speed reduction device is non-uniform as a result of elastic deformation in the planetary rollers occurring when the motor is stopped is much longer than the response time of the feedback control of the device in Japanese Patent Application Laid-open No. 2002-171779. Therefore, detecting non-uniformity of the rotation speed of the output shaft of the speed reduction device caused by elastic deformation of the planetary rollers that occurs when the motor is stopped and controlling the rotation speed by the feedback control of the device of Japanese Patent Application Laid-open No. 2002-171779 will result in over-control.

In view of the above, it will be apparent to those skilled in the art from this disclosure that there exists a need for an improved a drive device used in an image forming device. This invention addresses this need in the art as well as other needs, which will become apparent to those skilled in the art from this disclosure.

SUMMARY OF THE INVENTION

It is an object of the present invention to provide a drive device that prevents images from being affected by non-uniformity in the rotation speed of the output shaft of the speed reduction device caused by elastic deformation of the planetary rollers.

A drive device according to a first aspect of the present invention is a drive device that drives a rotating body in an image forming device, and includes a planetary roller type power transmission unit and a drive control unit. The planetary roller type power transmission unit includes a motor, a plurality of planetary rollers, a ring, a fixed body, a carrier roller, and an output shaft. A motor has and rotates a rotation shaft. The plurality of planetary rollers presses against the periphery of the rotation shaft of a motor, and is at least partly made from an elastic material. The ring contacts the plurality of planetary rollers on the internal surface and has a projecting portion on its outer surface. The fixed body is disposed to cover the ring and has an aperture located corresponding to the projecting portion of the ring, and the width of the aperture permits the projecting portion to move a predetermined distance. The carrier roller rotates in conjunction with the rotation of the planetary rollers. The output shaft outputs the rotation of the carrier roller to the outside. The drive control unit controls the rotation of the motor so that when the image forming device is not carrying out an image forming operation the projecting portion of the ring reciprocates within the aperture of the fixed body.

In this drive device, when the image forming device is not carrying out an image forming operation the motor is rotated at for example a low speed so that the projecting portion of the ring reciprocates within the aperture of the fixed body. The planetary rollers also rotate at a low speed in conjunction with the low speed rotation of the motor. At this time, there is play in the fixed body so it is possible to suppress the occurrence of wear of the planetary rollers on the contact surface of the planetary rollers and the ring. Further, the planetary rollers revolve forward and back on the outer surface of the motor rotation shaft in conjunction with the reciprocating motion of the projecting portion of the ring within the aperture of the fixed body. Therefore, even if elastic deformation occurs in the elastic material of the planetary rollers as a result of temporary stoppage of the rotation of the motor, the elastic material will extend so that the elastic deformation recovers, and finally there is no elastic deformation in the elastic material of the planetary rollers. Therefore the rotation speed of the output shaft of the drive device is constant and not affected by elastic deformation. Therefore, it is possible to prevent phenomena such as color distortion and color unevenness caused in images by non-uniformity of the rotation speed of the output shaft.

A drive device according to a second aspect of the present invention is the drive device according to the first aspect, wherein a drive control unit controls the rotation of the motor so that the projecting portion of the ring reciprocates within the aperture of the fixed body during a first period. The first period is the period from receipt of a signal indicating completion of an image forming operation until receipt of a signal instructing the start of the next image forming operation.

According to this drive device, it is possible to avoid having a constant part of the elastic material of the planetary rollers in contact with the outer surface of the motor rotation shaft. Therefore it is possible to avoid elastic deformation in the elastic material of the planetary rollers. Therefore, even when the image forming device starts an image forming operation, the rotation speed of the output shaft of this drive device is constant. Therefore, it is possible to avoid phenomena such as color distortion and color unevenness in images caused by non-uniformity of the rotation speed of the output shaft.

A drive device according to a third aspect of the present invention is the drive device according to the second aspect, wherein during the first period the rotation of the motor is further controlled so that the carrier roller is rotated through a predetermined angle at first predetermined time intervals.

This drive device controls the rotation of the motor so that at first predetermined time intervals the carrier roller is rotated through for example 180 degrees. Then the planetary rollers revolve about the motor rotation shaft as a center in conjunction with the carrier roller, and each planetary roller rotates about its own rotation axis. In this way, it is possible to vary the position of the elastic material of the planetary rollers in contact with the motor rotation shaft. Therefore, it is possible to prevent wear as a result of a specific part of the elastic material of the planetary rollers rotating forward and back on the outer surface of the motor rotation shaft, while the motor is rotating at low speed.

A drive device according to a fourth aspect of the present invention is the drive device according to the second aspect, wherein the drive control unit further controls the rotation of the motor so that after the projecting portion of the ring has contacted the inner wall of the aperture of the fixed body, the motor is rotated at a predetermined speed.

Depending on the position of the projecting portion of the ring within the aperture of the fixed body, rotation may not start immediately after the motor receives the signal instructing the motor to start up. For example, if the projecting portion of the ring is in a position where the projecting portion can move within the aperture of the fixed body, when the motor starts up the projecting portion of the ring will move through the distance that the projecting portion can move within the aperture. During this time the motor rotates at low speed. Then the drive device controls the rotation of the motor so that even if the projecting portion of the ring moves within the aperture of the fixed body, the motor rotates at the desired speed. In this way, the carrier roller and the planetary rollers continue to rotate, even though the rotation of the ring stops when the projecting portion of the ring has finished moving within the aperture of the fixed body. Therefore, the rotation of the carrier roller can be stably output to the outside while avoiding the effect of the low speed rotation of the motor.

A drive device according to the fifth aspect of the present invention is the drive device according to the first aspect, wherein during a second period from the start up of the motor until a second predetermined period of time has passed, the drive control unit controls the rotation of the motor so that the projecting portion of the ring reciprocates within the aperture of the fixed body.

While the motor is stopped, elastic deformation occurs in the part of the planetary rollers made from an elastic material that is in contact with the motor rotation shaft. However, according to this drive device, the part of the elastic material of the planetary rollers in which elastic deformation occurs is rotated forward and back on the outer surface of the motor rotation shaft, so the elastic material is extended by the motor rotation shaft and the elastic deformation recovers. Therefore, even when the image forming device starts an image forming operation, the rotation speed of the output shaft of this device is constant. Therefore, it is possible to avoid phenomena such as color distortion and color unevenness in images caused by non-uniformity of the rotation speed of the output shaft.

A drive device according to a sixth aspect of the present invention is the drive device according to the fifth aspect, further including a measurement unit that measures the temperature of the planetary rollers or the temperature near the planetary rollers. Also, the drive control unit further includes a second predetermined time determination unit and an image forming operation control unit. The second predetermined time determination unit determines the second predetermined time based on the temperature measured by the measurement unit. The image forming operation control unit starts image forming operations in the image forming unit after at least the second predetermined time has passed from the start up of the motor.

The time required for elastic deformation in the elastic material of the planetary rollers to recover depends on the temperature of the elastic material of the planetary rollers. Therefore this drive device determines the second predetermined time that the projecting portion of the ring reciprocates within the aperture of the fixed body in accordance with the temperature of the planetary rollers or the temperature near the planetary rollers. In this way, even in cases where the time for recovery of the elastic deformation varies because the temperature of the planetary rollers varies, the image forming operation starts after recovery of the elastic deformation.

A drive device according to a seventh aspect of the present invention is the drive device according to the fifth aspect, wherein the drive control unit further controls the rotation of the motor so that the planetary rollers revolve forwards and back by a predetermined amount on the outer surface of the motor rotation shaft with the part of the planetary rollers that has been in contact with the outer surface of the motor rotation shaft when the motor was stopped in the center.

While the motor is stopped, elastic deformation occurs in the part of the elastic material of the planetary rollers that is in contact with the motor rotation shaft. Therefore this drive device controls the rotation of the motor so that the part of the elastic material of the planetary rollers in which elastic deformation has occurred is in contact with the motor rotation shaft. In other words, when the projecting portion of the ring is reciprocating within the aperture of the fixed body, the planetary rollers revolve forwards and back on the outer surface of the motor rotation shaft with the part of the elastic material of the planetary rollers having the elastic deformation in the center. In this way, the part of the elastic material of the planetary rollers having the elastic deformation is extended and the elastic deformation recovers. In this way, it is possible to make the part of the elastic material of the planetary rollers having the elastic deformation recover reliably.

According to the present invention, it is possible to prevent non-uniformity of the rotation speed of the output shaft of the speed reduction device caused by elastic deformation of the planetary rollers from affecting the images.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 10 is a view of a reciprocating time table used to determine the reciprocating time;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
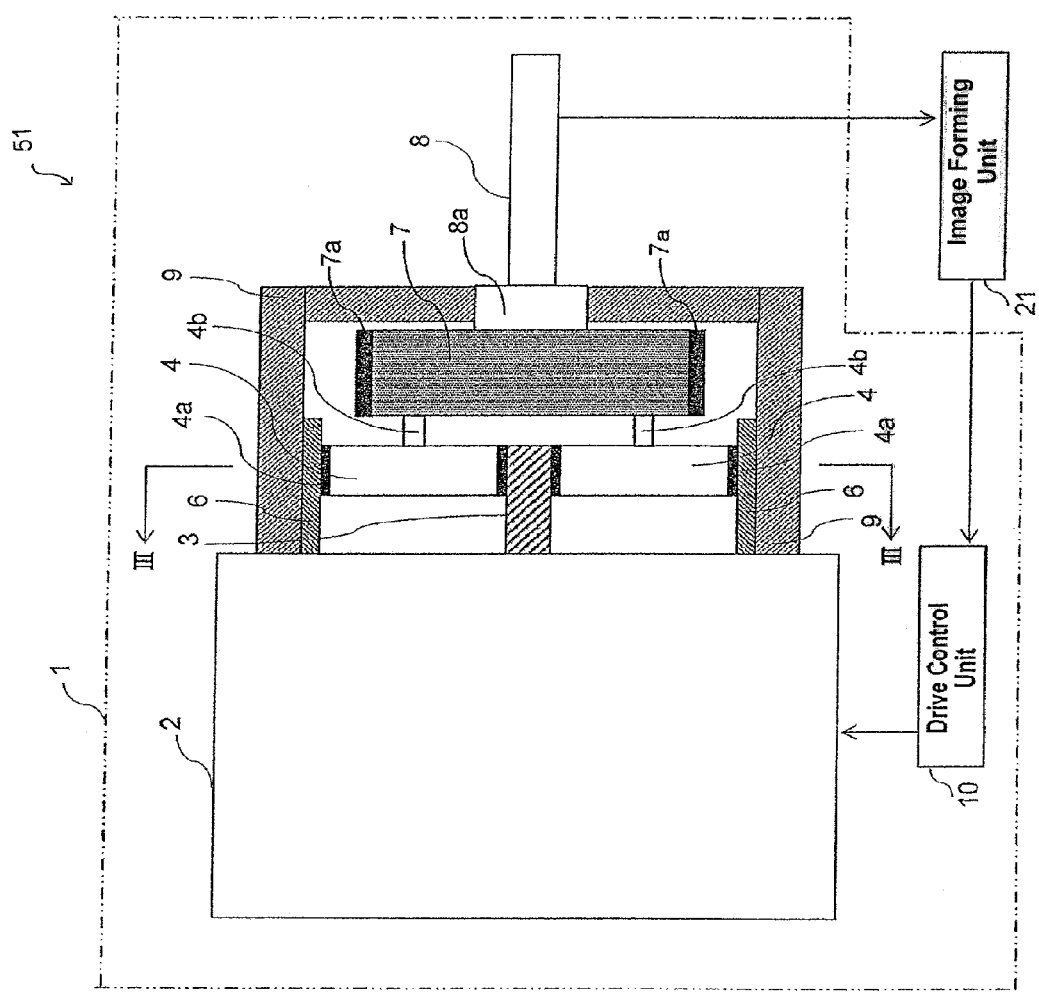
FIG. 1 is a schematic cross-sectional view of an image forming device showing the configuration of a drive device and connections with peripheral equipment according to a first preferred embodiment of the present invention.

FIG. 1 is a schematic cross-sectional view of an image forming device showing the configuration of a drive device and connections with peripheral equipment according to a first preferred embodiment of the present invention. The drive device 1 in FIG. 1 is connected to an image forming unit 21 in an image forming device 51, and used, for example, as the device to rotate and to drive a photosensitive drum provided within the image forming unit 21. The image forming device 51 is, for example, a color image forming device used in color printers or color copiers, and the like.

Figure 2:
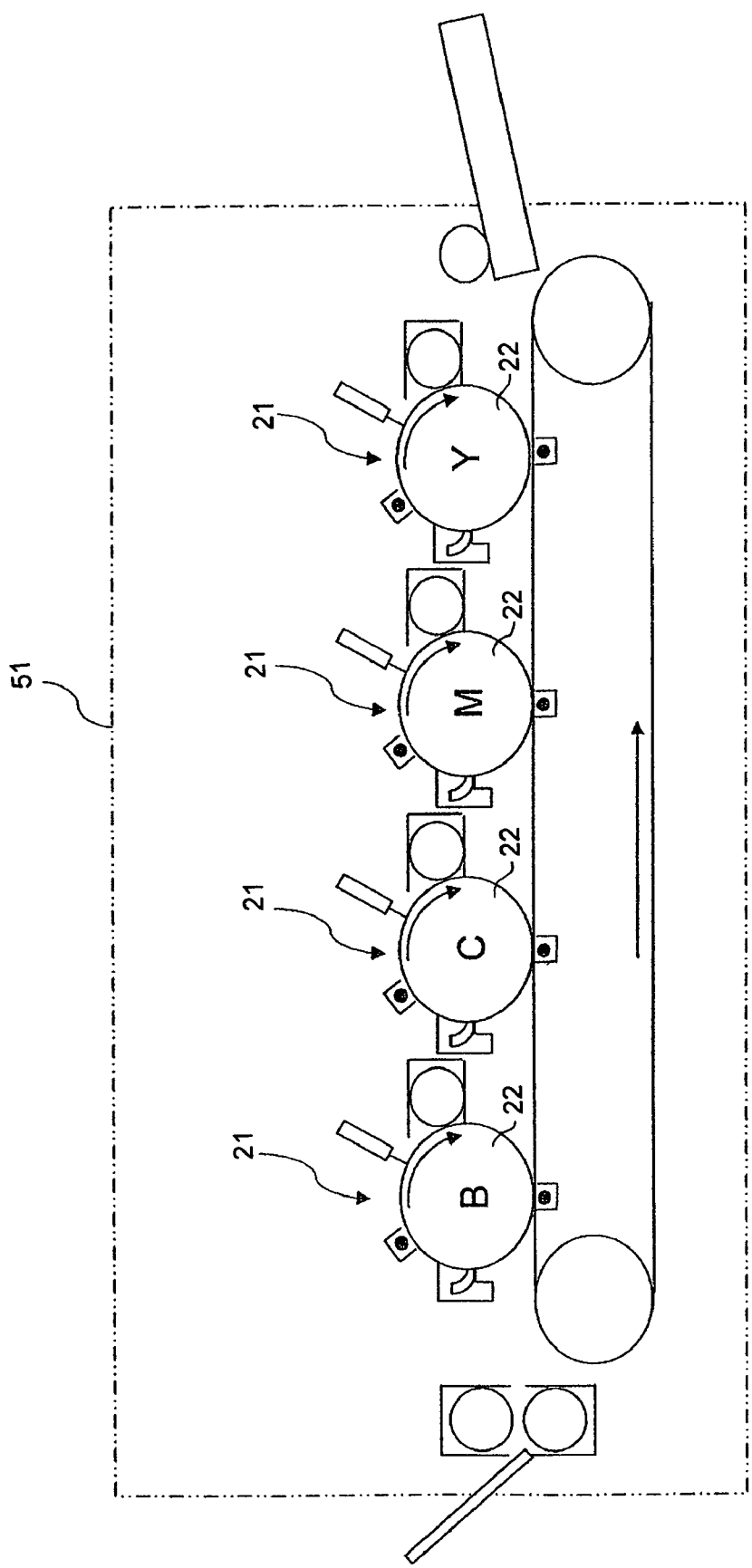
FIG. 2 is an alternate schematic view of an image forming device having an image forming unit.

FIG. 2 is a schematic view of the image forming device 51. The image forming device 51 is a so-called tandem-type image forming device, in which four color unfixed visible images are multiply transferred onto a recording sheet, following which the image is fixed. The image forming device 51 includes image forming units 21 for each color (Y, M, C, B), such as photosensitive drums 22 disposed along the sheet transport route. A drive device 1 is provided for each photosensitive drum 22 so that each photosensitive drum 22 can be driven.

(1) Configuration of the Drive Device

Figure 3:
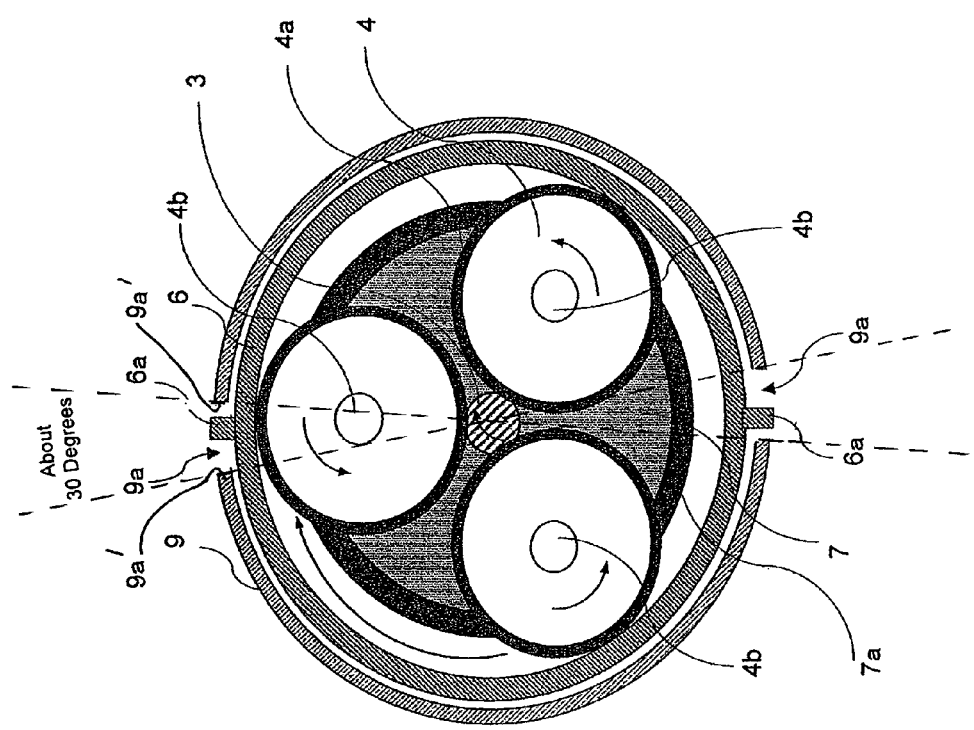
FIG. 3 is a sectional view taken at the line III-III of the drive device shown in FIG. 1.

FIG. 3 is a sectional view taken at the line III-III of the drive device 1 shown in FIG. 1. The following is an explanation of the configuration of the drive device 1 using FIGS. 1 and 3.

The drive device 1 according to the first embodiment includes a motor 2, a motor rotation shaft 3, a plurality of planetary rollers 4, a ring 6, a carrier roller 7, an output shaft 8, a fixed body 9, and a drive control unit 10.

The motor 2 rotates the motor rotation shaft 3. The motor rotation shaft 3 outputs the rotation of the motor 2 to the outside to the plurality of planetary rollers 4. The plurality of planetary rollers 4 presses against the external surface of the motor rotation shaft 3 to receive the output therefrom and the internal surface of the ring 6. The present embodiment is an example of a case where there are three planetary rollers 4. The edge of each planetary roller 4 is preferably formed from an elastic material 4a. The elastic material can be, for example, rubber or resin or the like. The ring 6 is positioned to enclose the three planetary rollers 4, and contacts the external surface of each planetary roller 4, preferably at the elastic material 4a. Furthermore, the ring 6 has a projecting portion 6a that projects from the outer surface. The carrier roller 7 is positioned on a side of the planetary rollers 4 opposite to the motor 2, and is coupled to the planetary rollers 4 via rotation shafts 4b of the planetary rollers 4. Also, the carrier roller 7 is connected to the output shaft 8 via a bearing 8a positioned in a part of the fixed body 9. The edge of the carrier roller 7 is preferably made from a magnet 7a. The output shaft 8 is collinear with the motor rotation shaft 3, and outputs the rotation of the carrier shaft 7 to the outside to the image forming unit 21. The fixed body 9 is positioned outside the motor 2, and encloses the motor rotation shaft 3, the three planetary rollers 4, the ring 6, and the carrier roller 7. Also, an aperture 9a is preferably formed in the fixed body 9 in a position corresponding to the projecting portion 6a of the ring 6. The aperture 9a has a width that allows the aperture 6a to move a predetermined distance therein. In the following, the planetary rollers 4, the ring 6, the carrier roller 7, the output shaft 8, and the fixed body 9 are collectively referred to as the "planetary roller type power transmission unit".

The drive control unit 10 is preferably positioned outside the motor 2 and outside the fixed body 9, and is connected to the motor 2, and the image forming unit 21. The configuration of the drive control unit 10 is described later.

(2) Operation of the Planetary Roller Type Power Transmission Unit and Motor Rotation Shaft Next, operation of the planetary roller type power transmission unit and motor rotation shaft 3 are explained using FIG. 3.

First, the motor rotation shaft 3 rotates in the rotation direction of the motor 2. Then the three planetary rollers 4 revolve around the motor rotation shaft 3 as center along the inner surface of the ring 6 in the same direction as the rotation direction of the motor rotation shaft 3. Furthermore, each planetary roller 4 rotates about the rotation axis of the respective planetary roller 4 in the opposite direction to the direction of rotation of the motor rotation shaft 3. The carrier roller 7 rotates in conjunction with the revolution of the planetary rollers 4. In other words, the carrier roller 7 rotates in the same direction as the rotation direction of the motor rotation shaft 3. At this time, the carrier roller 7 rotates with a rotation speed of the motor rotation shaft 3 reduced by the rotation of the planetary rollers 4.

The ring 6 rotates in conjunction with the revolution of the planetary rollers 4. In other words, the ring 6 rotates in the same direction as the planetary rollers 4 revolve about the motor rotation shaft 3 as center. However, the ring 6 has a projecting portion 6a, so the ring 6 only rotates by the amount that the projecting portion 6a can move within the aperture 9a of the fixed body 9. For example, if the motor rotation shaft 3 and the ring 6 rotate in the clockwise direction, when the projecting portion 6a of the ring 6 contacts an inner wall 9a' of the aperture 9a of the fixed body 9 rotation of the ring 6 stops. In this state, if the motor rotation shaft 3 starts to rotate in the opposite direction, the projecting portion 6a of the ring 6 separates from the inner wall 9a' of the aperture 9a that the projecting portion 6a was contacting, and the ring 6 rotates in the same direction as the motor rotation shaft 3. Then when the projecting portion 6a contacts the opposite inner wall 9a' of the aperture 9a of the fixed body 9, rotation of the ring 6 stops. In other words, by changing the direction of rotation of the motor rotation shaft 3, the projecting portion 6a of the ring 6 reciprocates within the aperture 9a of the fixed body 9.

(3) Configuration of the Drive Control Unit

Figure 4:
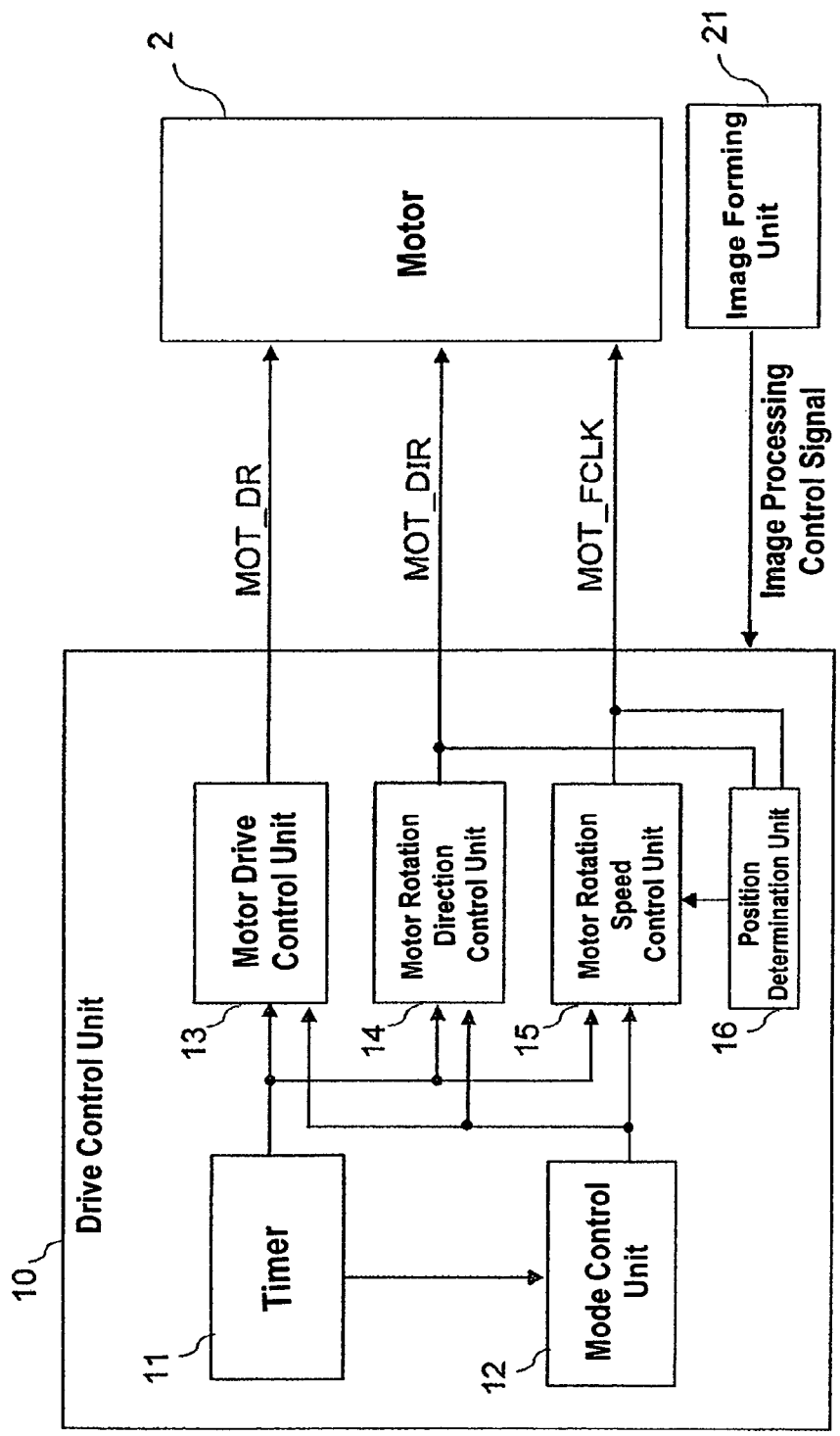
FIG. 4 is a diagrammatical view showing the configuration of the function of a drive control unit of the drive device according to the first preferred embodiment showing function units connected to the drive control unit.

Next, the function and configuration of the drive control unit 10 according to the present embodiment is explained using FIG. 4. The drive control unit 10 includes a timer 11, a mode control unit 12, a motor drive control unit 13, a motor rotation direction control unit 14, a motor rotation speed control unit 15, and a position determination unit 16.

The timer 11 outputs time information. The time information of the timer 11 is used by the mode control unit 12, the motor drive control unit 13, the motor rotation direction control unit 14, and the motor rotation speed control unit 15 when generating signals.

The mode control unit 12 controls the rotation mode of the motor 2. The mode control unit 12 controls the motor 2 to carry out two different types of rotation operations when the image forming unit 21 is not carrying out image forming operations. In particular the mode control unit 12 controls the motor 2 during a first period A from receipt from outside of an image forming command signal that indicates the completion of an image forming operation by the image forming unit 21 until receipt of an image forming command signal indicating an instruction to start the next image forming operation. Here, the "outside" that is the source of an image forming command signal could be for example the image forming unit 21. The rotation modes include a first mode in which the motor 2 is rotated so that the projecting portion 6a of the ring 6 reciprocates within the aperture 9a of the fixed body 9, and a second mode in which the motor 2 is rotated so that the carrier roller 7 rotates through a predetermined angle.

The motor drive control unit 13 controls the driving of the motor 2. Specifically, the motor drive control unit 13 generates motor drive control signals MOT_DR to turn the motor 2 ON or OFF, using the time information of the timer 11 as a criterion, and outputs the motor drive control signals MOT_DR to the motor 2.

The motor rotation direction control unit 14 generates motor rotation direction control signals MOT_DIR specifying the rotation direction of the motor 2 using time information from the timer 11 as a criterion. The motor rotation direction control unit 14 outputs the motor rotation direction control signals MOT_DIR to the motor 2. Specifically, the motor rotation direction control unit 14 controls the rotation direction of the motor 2 so that the projecting portion 6a of the ring 6 reciprocates within the aperture 9a of the fixed body 9 during the first period A. Also, after receipt of an image forming command signal instructing the start of an image forming operation, the motor rotation direction control unit 14 generates a motor rotation direction control signal MOT_DIR to rotate the motor 2 in the positive direction. The motor rotation direction control unit 14 then outputs the motor rotation direction control signals MOT_DIR to the motor 2.

The motor rotation speed control unit 15 generates motor rotation speed control signals MOT_FCLK specifying the rotation speed of the motor 2 using the time information from the timer 11 as a criterion. The motor rotation speed control unit 15 then outputs the motor rotation speed control signals MOT_FCLK to the motor 2. Specifically, during the first period A, the motor rotation speed control unit 15 controls the rotation speed of the motor 2 so that the projecting portion 6a of the ring 6 moves at low speed within the aperture 9a of the fixed body 9. Also, after receipt of an image forming command signal instructing the start of an image forming operation, the motor rotation speed control unit 15 generates a motor rotation speed control signal MOT_FCLK so that the motor 2 rotates at steady speed. The motor rotation speed control unit 15 then outputs the motor rotation speed control signal MOT_FCLK to the motor 2.

When an image forming command signal is received instructing the drive control unit 10 to start an image forming operation, the position determination unit 16 determines the current position of the projecting portion 6a within the aperture 9a, and outputs the result to the motor rotation speed control unit 15. More specifically, the position determination unit 16 monitors the motor rotation speed control signals MOT_FCLK and the motor rotation direction control signals MOT_DIR. Then, when the drive control unit 10 receives an image forming command signal instructing the start of an image forming operation, the position determination unit 16 determines the position of the projecting portion 6a within the aperture 9a based on the motor rotation speed control signal MOT_FCLK and the motor rotation direction control signal MOT_DIR output immediately before receipt of the signal.

(4) Operation of Each Function within the Drive Control Unit

Figure 5:
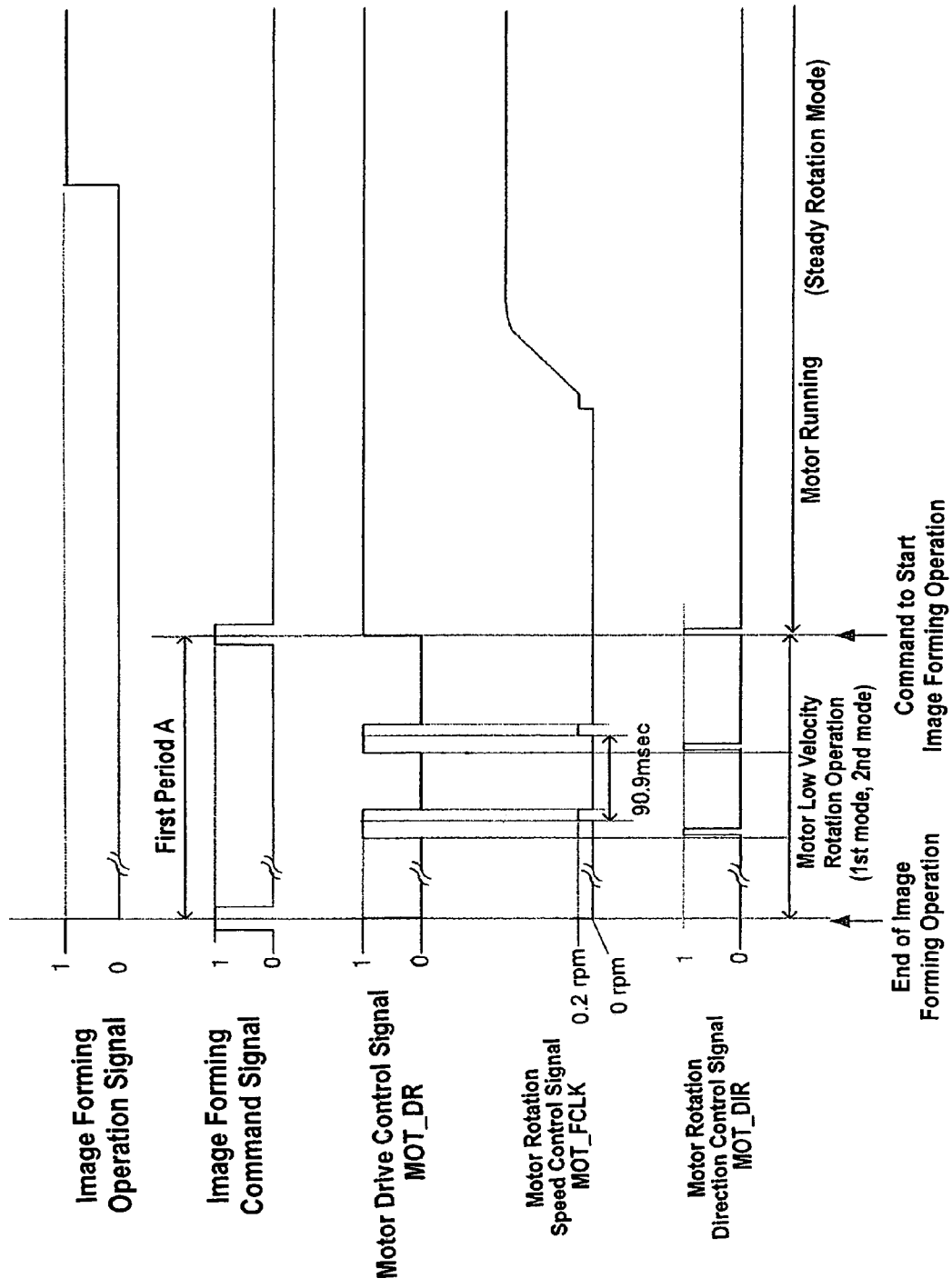
FIG. 5 is a view of a timing chart showing the various signals of the image forming device of the first embodiment.
Figure 6:
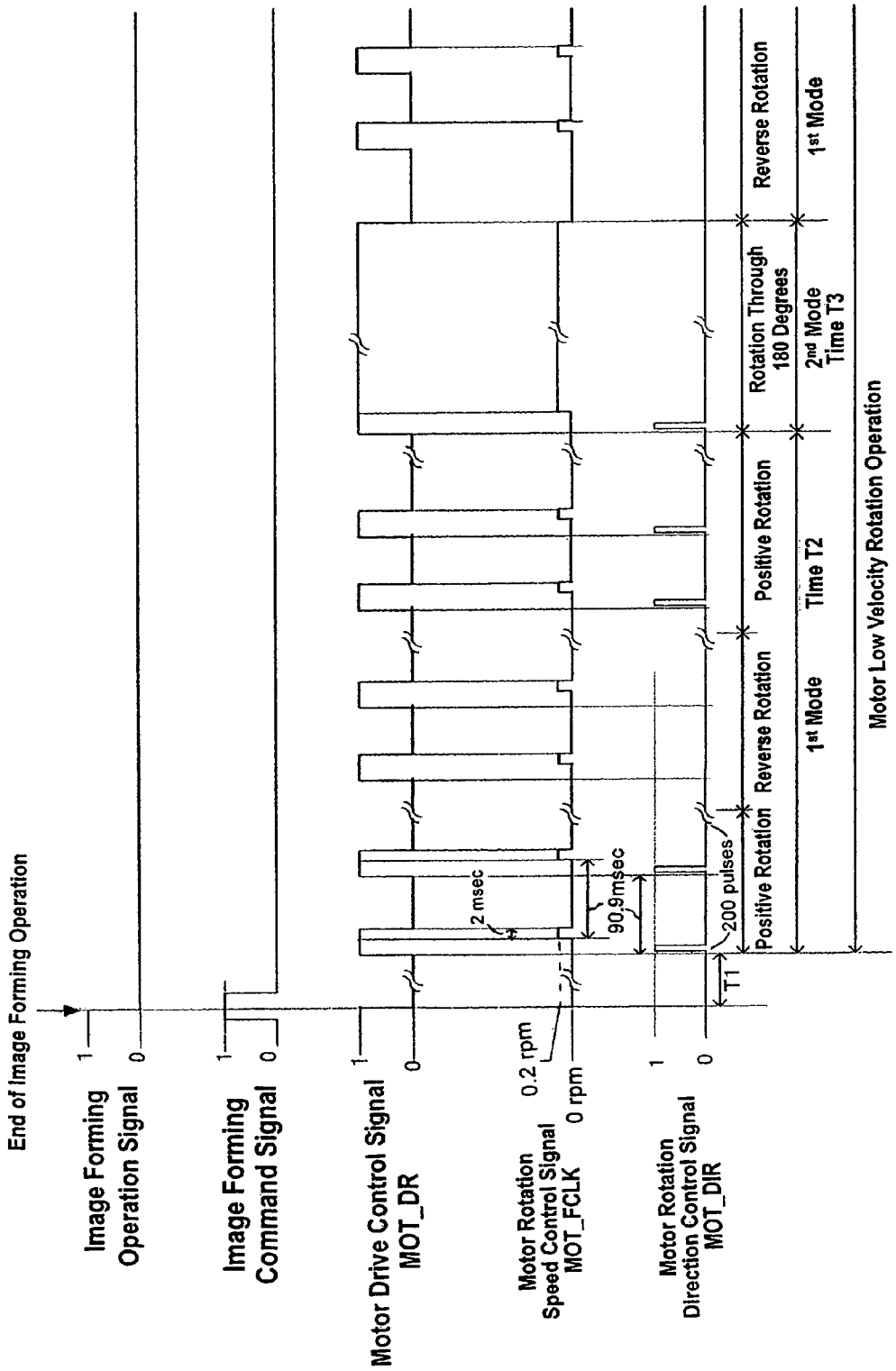
FIG. 6 is a view of a timing chart showing the various signals in FIG. 5 during low speed rotation operation of a motor of the driven device.

FIG. 5 is a view of a timing chart showing the operation of the drive control unit 10. FIG. 6 is a view of a timing chart showing period A in FIG. 5 enlarged. The following is an explanation of the operation of each function within the drive control unit 10 using FIGS. 5 and 6. Here, the image forming operation signal in FIG. 5 is a signal indicating whether the image forming unit 21 is carrying out an image forming operation or not. The image forming operation signal is represented by "1" when an image forming operation is being carried out, and by "0" when an image forming operation is not being carried out. The motor drive control signal MOT_DR is expressed by "0" when the motor is stopped, and "1" when the motor is running. The motor rotation direction control signal MOT_DIR is represented by "1" when the motor rotation shaft 3 rotates in the clockwise direction as shown in FIG. 3, and "0" in the counterclockwise direction.

First, referring now to FIGS. 1 and 3-6 when the drive control unit 10 receives an image forming command signal indicating completion of an image forming operation from, for example, the image forming unit 21, the mode control unit 12 of the drive control unit 10 starts to measure the time from receipt of the image forming command signal indicating completion of an image forming operation using time information from the timer 11. When the measured time exceeds the time T1, the mode control unit 12 outputs a first mode start command signal instructing the start of the first mode to the mode drive control unit 13, the motor direction control unit 14, and the motor rotation speed control unit 15. Here, the first mode start command signal is a signal to control the motor 2 to rotate in the first mode. In the present embodiment, the time T1 is for example one second.

(4-1) First Mode

When the motor drive control unit 13 receives the first mode start command signal from the mode control unit 12, a motor drive control signal MOT_DR for the first mode is output to the motor 2. Specifically, the motor drive control unit 13 periodically outputs a pulse having a predetermined period and predetermined pulse width during the first mode. In the present embodiment, the motor drive control unit 13 turns the motor 2 ON only to rotate the motor 2. The first mode is a state in which the image forming unit 21 is not carrying out an image forming operation. In other words, the first mode is a state in which the drive device 1 is awaiting an instruction to start an image forming operation. Therefore, to reduce the overall power consumption of the motor 2, the motor drive control unit 13 turns the motor ON only to rotate the motor 2 at low speed.

When the motor rotation direction control unit 14 receives the first mode start command signal from the mode control unit 12, a motor rotation direction control signal MOT_DIR for the first mode is output to the motor 2. Specifically, the motor rotation direction control unit 14 periodically outputs a pulse having a predetermined period and predetermined HIGH period during the first mode. The motor rotation direction control unit 14 repeats this operation. Here, the pulse number periodically output is determined from for example the width of the aperture 9a formed in the fixed body 9 and the rotation speed of the motor 2 while the projecting portion 6a of the ring 6 is reciprocating within the aperture 9a. In the present embodiment, if for example the aperture 9a has a width equivalent to about 30 or to 30 degrees of rotation of the motor rotation shaft 3 in FIG. 3, and the rotation speed of the motor 2 while the projecting portion 6a is reciprocating within the aperture 9a is 0.2 rpm, then the pulse period of a motor rotation direction control signal MOT_DIR is about 90.9 ms and the pulse number of a motor rotation direction control signal MOT_DIR is about 200.

The motor rotation speed control unit 15 outputs a motor rotation speed control signal MOT_FCLK for the first mode to the motor 2 when the motor rotation speed control unit 15 has received a first mode start command signal from the mode control unit 12. Specifically, the motor rotation speed control unit 15 periodically outputs a pulse having a predetermined period and a predetermined HIGH period indicating a constant rotation speed. In the present embodiment, assuming for example that the motor 2 rotates at the speed 0.2 rpm, the period of the motor rotation speed control signal MOT_FCLK is about 90.9 ms, and the HIGH period of the motor rotation speed control signal MOT_FCLK is about 2 ms (duty: 2.2%).

In this way, the period of each signal sent by the motor drive control unit 13, the motor rotation direction control unit 14, and the motor rotation direction control unit 15 to rotate the motor 2 in the first mode is the same.

As stated above, during the first mode, the motor 2 rotates at low speed in the clockwise direction and the counterclockwise direction based on each signal transmitted from the motor drive control unit 13, the motor rotation direction control unit 14, and the motor rotation speed control unit 15. Then the projecting portion 6a of the ring 6 reciprocates within the aperture 9a of the fixed body 9, and the planetary rollers 4 rotate forward and back by a predetermined amount on the outer surface of the motor rotation shaft 3. In this way, the elastic material 4a of the planetary rollers 4 does not press at one fixed location against the outer surface of the motor rotation shaft 3.

(4-2) Second Mode

The mode control unit 12 measures the time from the output of a first mode start command signal based on time information from the timer 11. When the measured time exceeds the time T2 (corresponding to the first predetermined time), the mode control unit 12 outputs a second mode start command signal to the motor drive control unit 13, the motor rotation direction control unit 14, and the motor rotation speed control unit 15. Here, the second mode start command signal is a signal that controls the motor 2 to rotate in the second mode. In the present embodiment the time T2 is about 15 minutes.

After receiving the second mode start command signal from the mode control unit 12, the motor drive control unit 13 outputs a motor drive control signal MOT_DR for the second mode to the motor 2. Specifically, the motor drive control unit 13 outputs the motor drive control signal MOT_DR "1" in the second mode.

After receiving the second mode start command signal from the mode control unit 12, the motor rotation direction control unit 14 outputs a motor rotation direction control signal MOT_DIR for the second mode to the motor 2. Specifically, in the second mode, to rotate the motor 2 in a constant direction, a pulse having the same pulse width as the pulse during the first mode is output to the motor 2 immediately after receiving the second mode start command signal. In the present embodiment, the motor rotation direction control unit 14 outputs a pulse to rotate the motor 2 in a clockwise direction.

After receiving the second mode start command signal from the mode control unit 12, the motor rotation speed control unit 15 outputs a motor rotation speed control signal MOT_FCLK for the second mode to the motor 2. Specifically, in the second mode, to rotate the motor 2 at a constant low speed the motor rotation speed control unit 15 continues to output a signal indicating a rotation speed the same as the rotation speed in the first mode.

The mode control unit 12 measures the time from outputting the second mode start command signal, based on time information from the timer 11. When the measured time exceeds the time T3 for the carried roller 7 to rotate through a predetermined angle, the mode control unit 12 outputs a first mode start command signal to the motor drive control unit 13, the motor rotation direction control unit 14, and the motor rotation speed control unit 15. Here, the time T3 is determined by the predetermined angle through which the carrier roller 7 rotates. For example, if the carrier roller 7 rotates through 180 degrees, and if the reduction ratio of the motor rotation shaft 3 and the output shaft 8 is 8:1, the motor 2 must rotate through 1440 degrees, that is 4 revolutions. In this case, the time T3 is the time required by the motor 2 to rotate through 4 revolutions at the rotation speed controlled by the motor rotation speed control unit 15.

As stated above, in the second mode, the motor 2 rotates in a constant direction at low speed, based on each signal transmitted from the motor drive control unit 13, the motor rotation direction control unit 14, and the motor rotation speed control unit 15. Therefore, the projecting portion 6a of the ring 6 stops in contact with the inner wall 9a' of the aperture 9a of the fixed body 9 in the direction of rotation. However, thereafter also the planetary rollers 4 revolve about the outer surface of the motor rotation shaft 3 with the motor rotation shaft 3 as center, and rotate about the rotation shaft of each planetary roller 4. The carrier roller 7 rotates through a predetermined angle in conjunction with the planetary rollers 4. In this way, the position of the elastic material 4a of the planetary rollers 4 in contact with the motor rotation shaft 3 is varied.

The mode control unit 12, the motor drive control unit 13, the motor rotation direction control unit 14, and the motor rotation speed control unit 15 repeatedly control the motor 2 to rotate in the first mode or in the second mode, until an image forming command signal that instructs the start of an image forming operation is received.

(4-3) Steady Rotation Mode

After the drive control unit 10 receives an image forming command signal instructing the start of an image forming operation from outside, the mode control unit 12 of the drive control unit 10 outputs a signal to switch the rotation control of the motor 2 to the steady rotation mode to the motor drive control unit 13, the motor rotation direction control unit 14, and the motor rotation speed control unit 15. The steady rotation mode is a mode in which the motor 2 rotates at a constant speed. Then, the motor drive control unit 13 outputs a motor drive control signal MOT_DR "1" to the motor 2. The motor rotation direction control unit 14 and the motor rotation speed control unit 15 output signals to the motor 2 to rotate the motor 2 in one direction at a constant speed that is faster than the speed when waiting to receive a signal instructing the start of an image forming operation.

Here, when the motor 2 starts to rotate at a constant speed, the position of the projecting portion 6a of the ring 6 within the aperture 9a of the fixed body 9 varies in accordance with the timing that drive control unit 10 receives the command to start the image forming operation. In other words, when the motor 2 starts to rotate with a constant speed, if the projecting portion 6a of the ring 6 is not contacting the inner wall 9a' of the aperture 9a of the fixed body 9 in the direction of rotation of the motor rotation shaft 3, the projecting portion 6a moves to the inner wall 9a' of the aperture 9a in the direction of rotation of the motor rotation shaft 3 immediately after the motor 2 starts to rotate at the constant speed. Until the projecting portion 6a moves to and contacts the inner wall 9a' of the aperture 9a, the load at the area of contact between the elastic material 4a of the planetary rollers 4 and the ring 6 is small. Therefore, the motor 2 rotates at low speed. Then, to rotate the motor 2 at a constant speed, the motor rotation speed control unit 15 outputs a motor rotation speed control signal MOT_FCLK to the motor 2 so that the motor 2 absorbs the low speed rotation of the motor 2, and rotates at a constant speed. Specifically, after the drive control unit 10 receives an image forming command signal instructing the start of an image forming operation, the position determination unit 16 within the drive control unit 10 determines the position of the projecting portion 6a within the aperture 9a. The position is determined based on the motor rotation direction control signal MOT_DIR and the motor rotation speed control signal MOT_FCLK respectively output by the motor rotation direction control unit 14 and the motor rotation speed control unit 15 immediately before receipt of the image forming command signal by the drive control unit 10. Then the position is output to the motor rotation speed control unit 15. Based on the position information regarding the projecting portion 6a received from the position determination unit 16, the motor rotation speed control unit 15 first outputs to the motor 2 a motor rotation speed control signal MOT_FCLK to bring the projecting portion 6a into contact with the inner wall 9a' of the aperture 9a in the direction of rotation of the motor rotation shaft. Next, the motor rotation speed control unit 15 outputs to the motor 2 a motor rotation speed control signal MOT_FCLK to rotate the motor 2 at constant speed. In this way, the motor 2 rotates at low speed until the projecting portion 6a contacts the inner wall 9a' of the aperture 9a and the rotation of the ring 6 stops. Thereafter the motor 2 reaches the constant rotation speed state. When the motor 2 reaches the constant rotation speed state, the image forming unit 21 executes the image forming operation (image forming operation signal "1").

(5) Effect

During the first period A, the drive device 1 according to the present embodiment rotates the motor 2 at a low speed so that the projecting portion 6a of the ring 6 reciprocates within the aperture 9a of the fixed body 9. In this way, the planetary rollers 4 also rotate at a low speed. Therefore, it is possible to avoid pressure being applied at a constant location on the elastic material 4a of the planetary rollers 4 through contact with the outer surface of the motor rotation shaft 3. Therefore, it is possible to prevent elastic deformation occurring in the elastic material 4a of the planetary roller 4. Therefore, even if the image forming operation is started by the image forming driven device 21, the rotation speed of the output shaft of the drive device 1 is constant. Therefore, it is possible to prevent phenomena such as color distortion or color unevenness in images caused by non-uniformity of the rotation speed of the output shaft. Also, it is possible to suppress the occurrence of wear in the planetary rollers 4 on the contact surface of the planetary rollers 4 and the ring 6 as a result of the play in the fixed body 9 when the motor 2 and planetary rollers 4 are rotated at low speed.

Furthermore, every time the time T2 has passed, the drive device 1 controls the motor 2 to rotate the carrier roller 7 through a predetermined angle. At this time, the planetary rollers 4 also rotate, so it is possible to change the position of the elastic material 4a of the planetary rollers 4 in contact with the motor rotation shaft 3. Therefore, while the motor 2 is rotating at low speed, it is possible to prevent rubbing and wear at a specific part of the elastic material 4a of the planetary rollers 4 and the outer surface of the motor rotation shaft 3.

Alternate Embodiments

Alternate embodiments will now be explained. In view of the similarity between the first and alternate embodiments, the parts of the alternate embodiment that are identical to the parts of the first embodiment will be given the same reference numerals as the parts of the first embodiment. Moreover, the descriptions of the parts of the alternate embodiments that are identical to the parts of the first embodiment may be omitted for the sake of brevity.

Second Embodiment

Figure 7:
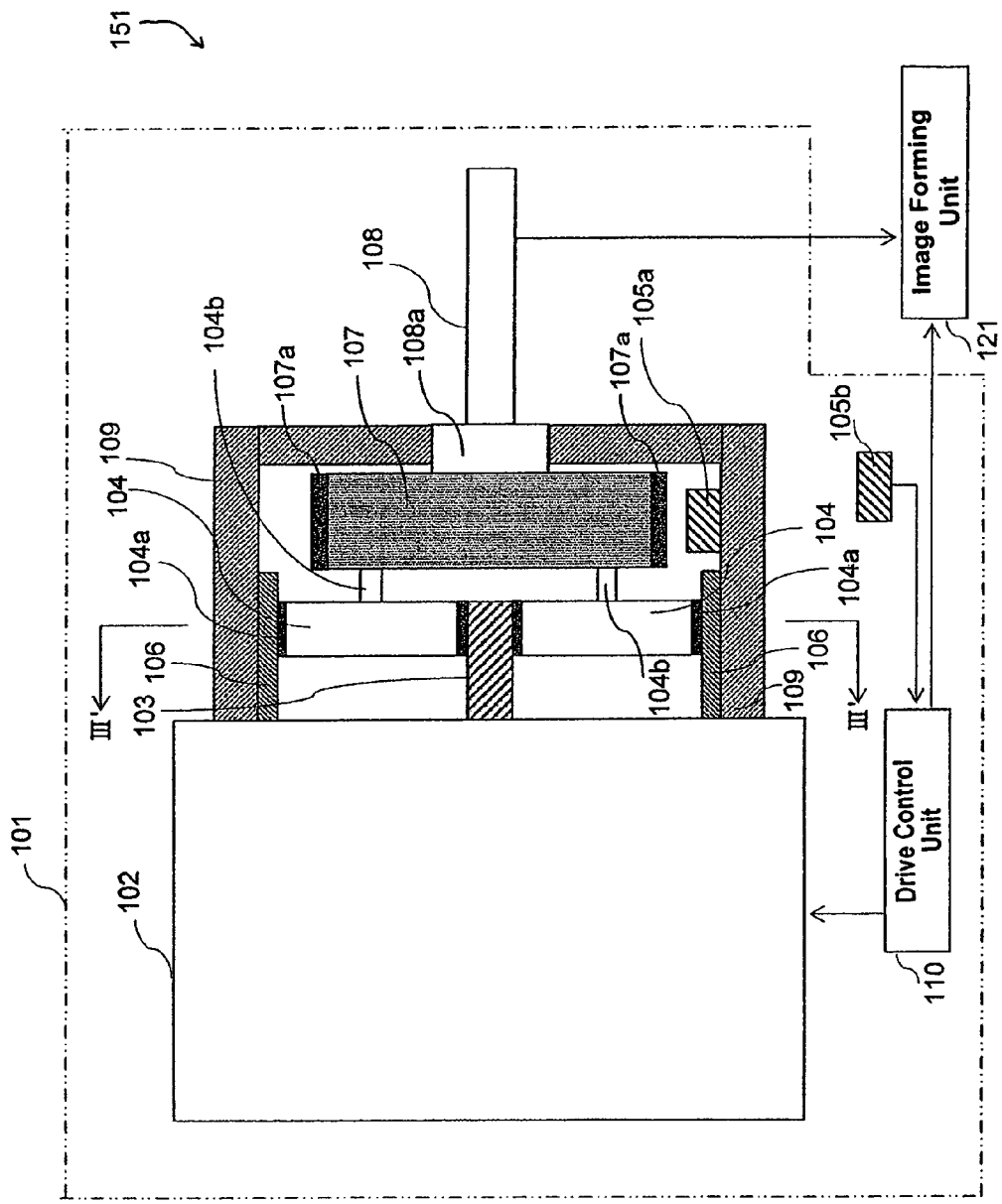
FIG. 7 is a schematic cross-sectional view of an image forming device showing the configuration of a drive device and connections with peripheral equipment according to a second preferred embodiment.

FIG. 7 is schematic cross-sectional view showing the configuration of a drive device and its connections with peripheral equipment according to a second preferred embodiment. The drive device 101 in FIG. 7 is connected to an image forming unit 121 in an image forming device 151, and used as a device to drive a photosensitive drum provided within the image forming unit 121. The image forming device 151 is for example a color image forming device used in color printers, color copiers, and the like, the same as or similar to that in the first embodiment. The configuration of the image forming unit 121 is the same as or similar to that of the image forming unit 21 of the first embodiment so the explanation has been omitted.

(1) Configuration of the Drive Device

Figure 8:
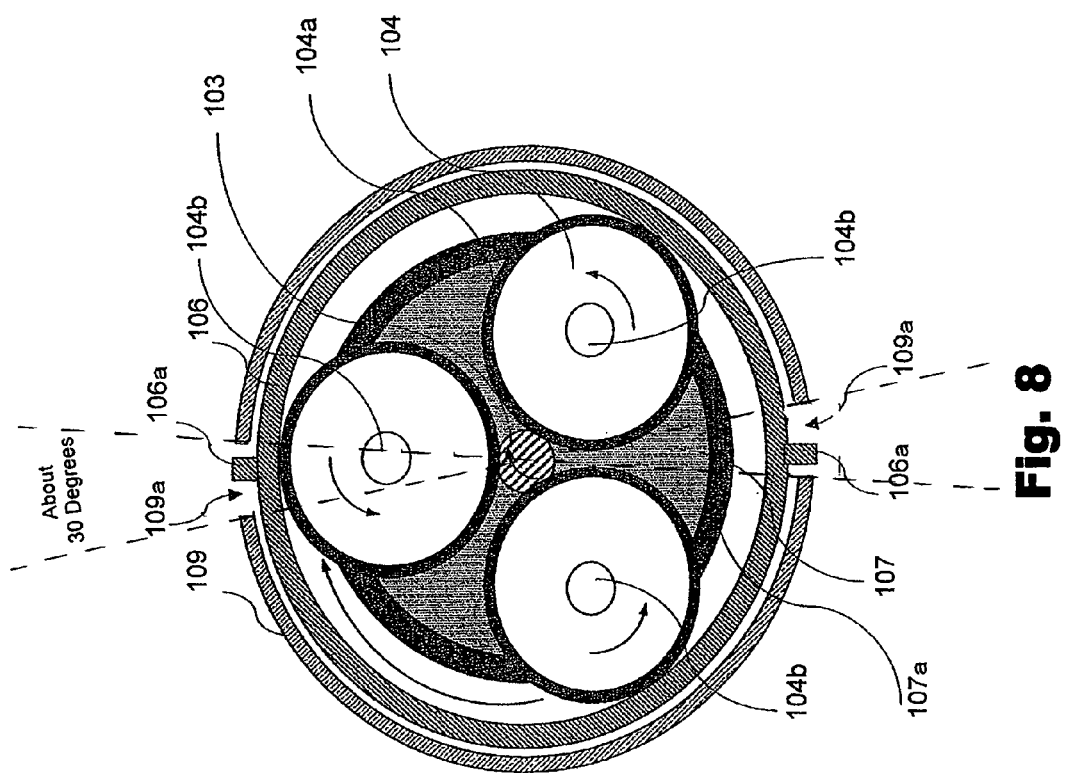
FIG. 8 is a sectional view at the line III'-III' of the drive device shown in FIG. 7.

FIG. 8 is a sectional view taken at the line III'-III' of the drive device shown in FIG. 7. The following is an explanation of the configuration of the drive device 101 using FIGS. 7 and 8.

In addition to the configuration of the drive device 1 according to the first embodiment, the drive device 101 according to the second embodiment further includes a rotation speed sensor 105a and a temperature sensor 105b (corresponding to the measurement unit). In other words, the drive device 101 includes a motor 102, a motor rotation shaft 103, a plurality of planetary rollers 104, the rotation speed sensor 105a, the temperature sensor 105b, a ring 106, a carrier roller 107, an output shaft 108, a fixed body 109, and a drive control unit 110.

In other words, the motor 102 rotates the motor rotation shaft 103. The motor rotation shaft 103 outputs the rotation of the motor 102 to the outside to the plurality of planetary rollers 104. The plurality of planetary rollers 104 presses against the external surface of the motor rotation shaft 103 and the internal surface of the ring 106. The edge of each planetary roller 104 is formed from an elastic material 104a such as rubber or resin or the like. The present embodiment is an example of the case where there are three planetary rollers 104, the same as in the first embodiment. The rotation speed sensor 105a is preferably located on the internal surface of the fixed body 109, and measures the rotation speed of the carrier roller 107. The temperature sensor 105b is provided outside the motor 102 and the fixed body 109, near to or on the fixed body 109, and measures the temperature Te of the entire planetary roller type power transmission unit that is described later. The ring 106 is positioned to enclose the three planetary rollers 104, and contacts the external surface of each planetary roller 104, preferably at the elastic material 104a. Furthermore, the ring 106 has a projecting portion 106a that projects from the outer surface. The carrier roller 107 is positioned on the opposite side to the motor 102 viewed from the planetary rollers 104, and is coupled to the planetary rollers 104 via rotation shafts 104a of the planetary rollers 104. Also, the carrier roller 107 is connected to the output shaft 108 via a bearing 108a positioned in a part of the fixed body 109. The edge of the carrier roller 107 is made from a magnet 107a. The output shaft 108 is collinear with the motor rotation shaft 103, and outputs the rotation of the carrier shaft 107 to the outside. The fixed body 109 is positioned outside the motor 102, and encloses the motor rotation shaft 103, the three planetary rollers 104, the rotation speed sensor 105a, the ring 106, and the carrier roller 107. Further, an aperture 109a is formed in the fixed body 109 in a position corresponding to the projecting portion 106a of the ring 106. The aperture 109a has a width such that the projecting portion 106a can move a predetermined distance. In the following, the planetary rollers 104, the ring 106, the carrier roller 107, the output shaft 108, and the fixed body 109 are collectively referred to as the "planetary roller type power transmission unit."

The operation of the planetary roller type power transmission unit and the motor rotation shaft 103 is the same as or the similar to that described in the subsection entitled "(2) Operation of the planetary roller type power transmission unit and motor rotation shaft" of the first embodiment, so the explanation thereof is omitted.

The drive control unit 110 is located outside the motor 102 and the fixed body 109, and is connected to the motor 102, the temperature sensor 105b, and the image forming unit 121.

(2) Configuration of the Drive Control Unit

Figure 9:
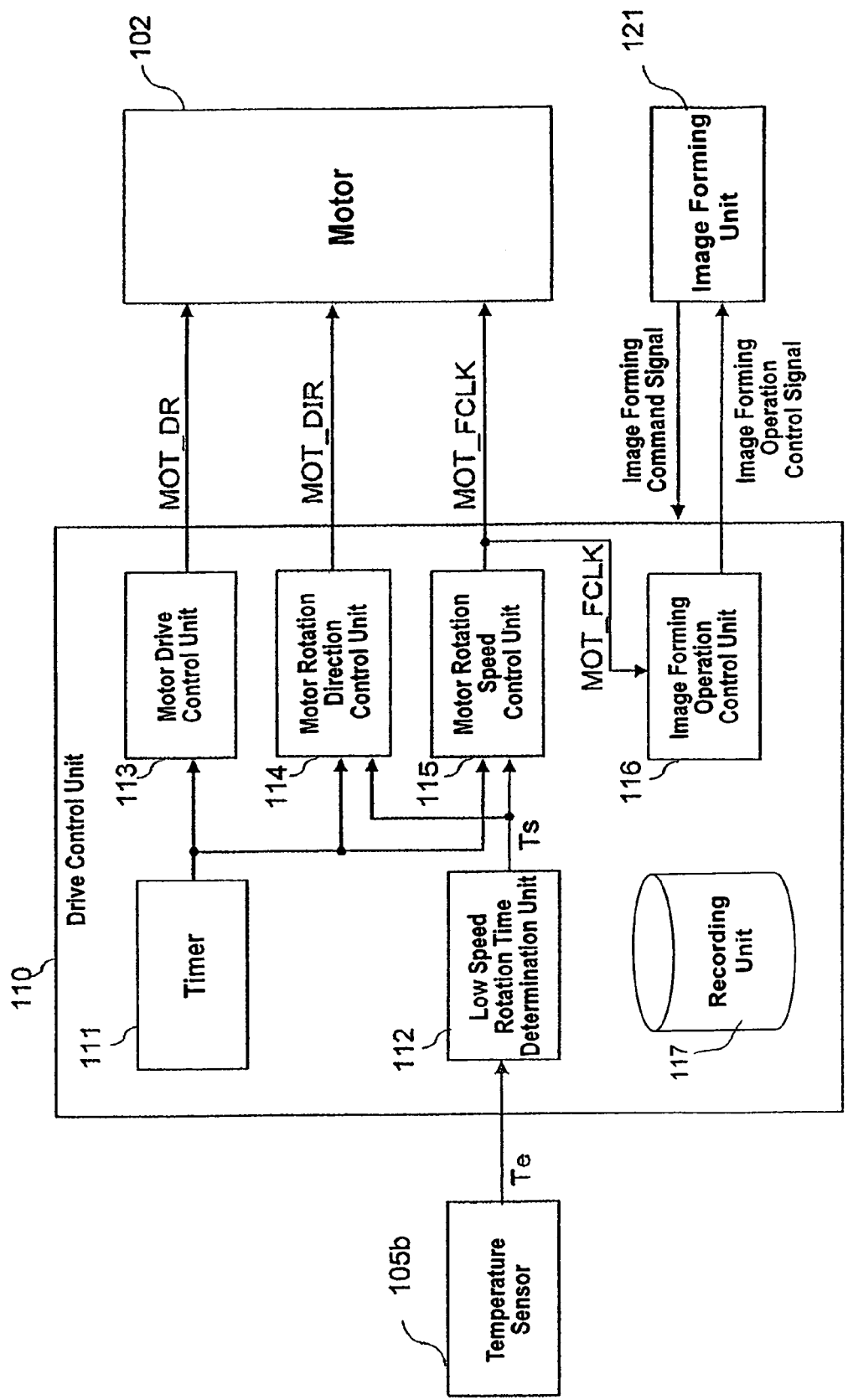
FIG. 9 is a diagrammatical view showing the configuration of the function of a drive control unit of the drive device according to the second embodiment showing function units connected to the drive control unit.

Next, the function and configuration of the drive control unit 110 according to the present embodiment is explained using FIG. 7-9. The drive control unit 110 includes a timer 111, a low speed rotation time determination unit 112 (corresponds to the second predetermined time determination unit), a motor drive control unit 113, a motor rotation direction control unit 114, a motor rotation speed control unit 115, an image forming operation control unit 116, and a recording unit 117.

The timer 111 outputs time information. The time information of the timer 111 is used by the motor drive control unit 113, the motor rotation direction control unit 114, and the motor rotation speed control unit 115 when generating signals.

When the drive control unit 110 receives an image forming command signal to start an image forming operation from the outside, the low speed rotation time determination unit 112 determines the reciprocating time Ts (corresponds to the second predetermined time) of the projecting portion 106a of the ring 106 in the aperture 109a of the fixed body 109. The reciprocating time Ts is determined based on the temperature Te of the entire planetary roller type power transmission unit including the temperature of the elastic material 104a of the planetary rollers 104 measured by the temperature sensor 105b. Here, "the outside" refers to for example the image forming unit 121 or the like. Next, the low speed rotation time determination unit 112 outputs the reciprocating time Ts to the motor rotation direction control unit 114 and the motor rotation speed control unit 115. The sequence of the timing of determining the reciprocating time Ts by the low speed rotation time determination unit 112 based on the temperature Te and the timing of driving the motor 102 by the motor drive control unit 113 is not particularly limited. Either one may be carried out first.

The following is an example of the determination of the reciprocating time Ts by the low speed rotation time determination unit 112. The recording unit 117 in FIG. 9 records a reciprocating time table to determine the reciprocating time, as shown in FIG. 10. The reciprocating time table in FIG. 10 records temperature ranges and formulae for the conditions for the reciprocating time Ts as one record. The formulae for the conditions for the reciprocating time Ts are the conditions that determine the reciprocating time Ts so that the reciprocating time Ts is equal to or longer than the time required for the elastic deformation occurring in the elastic material 104a of the planetary rollers 4 when the motor is static to recover. For example, the condition that determines the reciprocating time Ts "Ts=10+(20−Te)/2.89" is recorded corresponding to the temperature range "$0 \leq Te < 20$". Here, 2.89 is a value associated with the type of fixing material used in a fixing device which is not shown in FIGS. 7 and 8. The conditions that determines the reciprocating time Ts may be based on the elastic modulus of the elastic material 104a in the planetary rollers 104. The elastic modulus of the elastic material 104a vary depending on the type of material.

Referring to FIGS. 7-10, the low speed rotation time determination unit 112 determines which of the plurality of temperature ranges in the reciprocating time table in FIG. 10 corresponds to the temperature Te measured by the temperature sensor 105b. Next, the low speed rotation time determination unit 112 determines the reciprocating time Ts for the temperature range corresponding to the temperature Te. Then the low speed rotation time determination unit 112 outputs the reciprocating time Ts to the motor rotation direction control unit 114 and the motor rotation speed control unit 115.

The motor drive control unit 113 controls the operation of the motor 102. For example, the motor drive control unit 113 generates motor drive control signals MOT_DR to control turning the motor 102 ON or OFF, based on time information from the timer 111, and outputs the signals to the motor 102.

The motor rotation direction control unit 114 generates motor rotation direction control signals MOT_DIR to specify the rotation direction of the motor 102, and outputs the signal to the motor 102. Specifically, when the motor rotation direction control unit 114 receives the reciprocating time Ts from the low speed rotation time determination unit 112, the motor rotation direction control unit 114 starts to measure the reciprocating time Ts from the time that an image forming command signal instructing the start of an image forming operation is received from the outside, based on time information from the timer 111. Then the motor rotation direction control unit 114 outputs motor rotation direction control signal MOT_DIR at predetermined time intervals to the motor 102 so that the projecting portion 106a of the ring 106 reciprocates within the aperture 109a of the fixed body 109 until the measured time is greater than the reciprocating time Ts (corresponds to the second time period B).

Further, after the reciprocating time Ts has passed, the motor rotation direction control unit 114 generates a motor rotation direction control signal MOT_DIR to rotate the motor 102 in the positive direction. Then the motor rotation direction control unit 114 outputs the signal to the motor 102.

The motor rotation speed control unit 115 generates motor rotation speed control signals MOT_FCLK to specify the rotation speed of the motor 102, and outputs the signals to the motor 102. Specifically, when the motor rotation speed control unit 115 receives the reciprocating time Ts from the low speed rotation time determination unit 112, the motor rotation speed control unit 115 starts to measure the reciprocating time Ts from the time that an image forming command signal instructing the start of an image forming operation is received from the outside based on time information from the timer 111. After the reciprocating time Ts has passed, the motor rotation speed control unit 115 generates a motor rotation speed control signal MOT_FCLK to move the projecting portion 106a of the ring 106 at low speed within the aperture 109a of the fixed body 109, and outputs the signal at predetermined time intervals to the motor 102 and the image forming operation control unit 116.

Also, after the reciprocating time Ts has passed, the motor rotation speed control unit 115 generates a motor rotation speed control signal MOT_FCLK to rotate the motor 102 at constant speed, and outputs the signal to the motor 102 and the image forming operation control unit 116.

The image forming operation control unit 116 generates image forming operation control signals to control the execution and termination of image forming operations in the image forming unit 121, and transmits the signals to the image forming unit 121. Specifically, the image forming operation control unit 116 monitors motor rotation speed control signals MOT_FCLK, and after these signals become constant the image forming operation control unit 116 controls the image forming unit 121 to start an image forming operation. Here, image forming operations include for example color registration processes, calibration processes, and other image forming correction processes.

(3) Operation of Each Function within the Drive Control Unit

Figure 11:
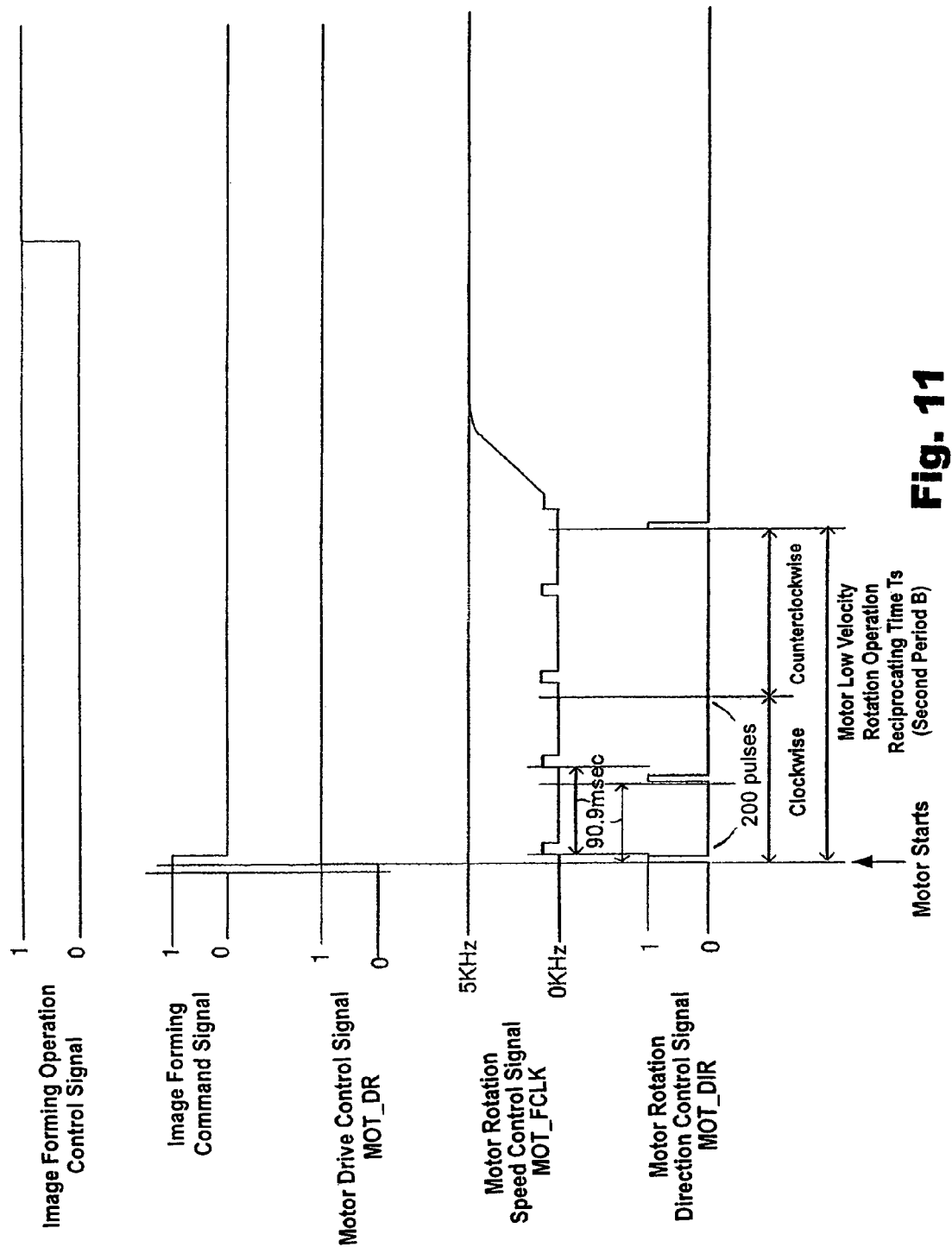
FIG. 11 is a view of a timing chart showing the various signals in the second embodiment.
Figure 12:
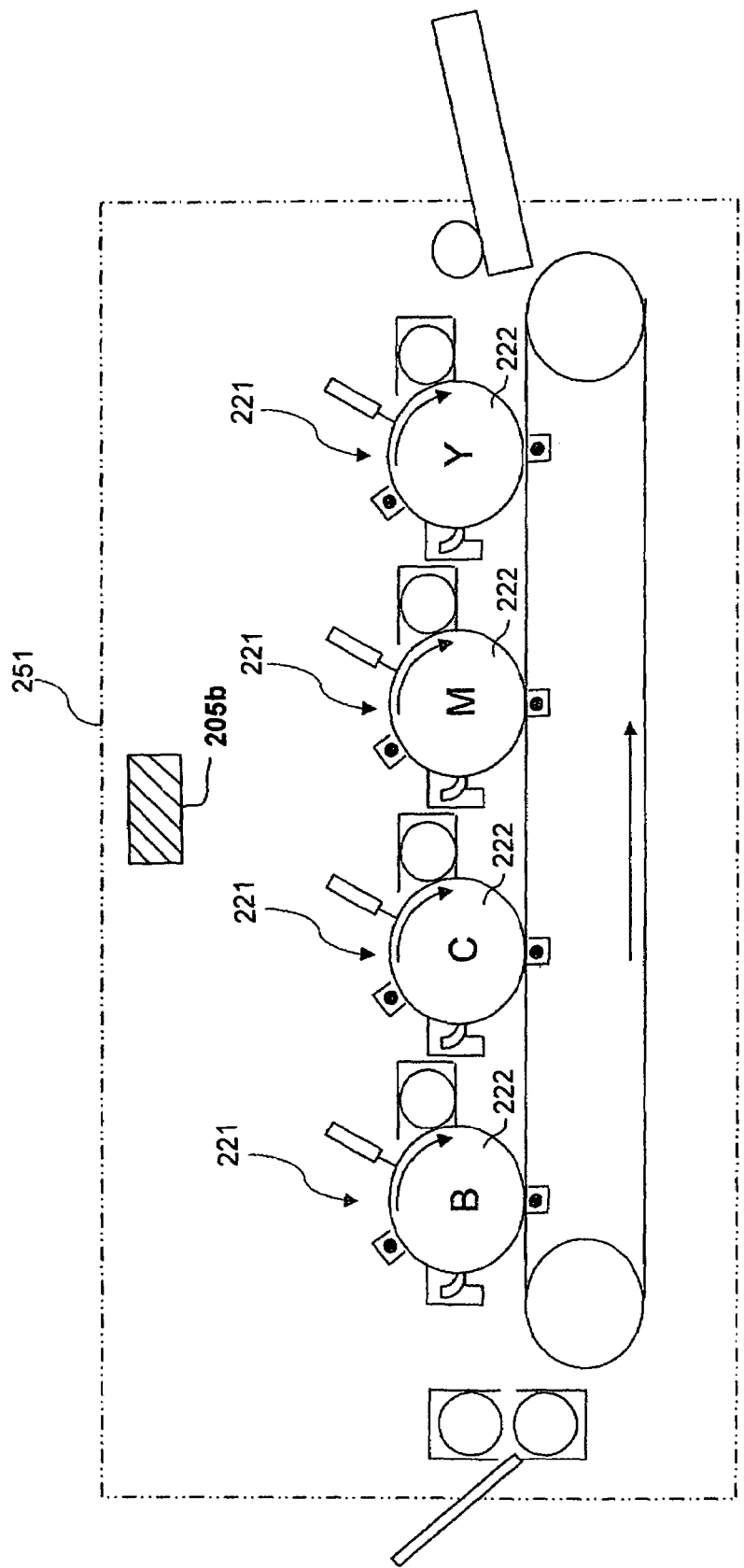
FIG. 12 is a schematic view of an image forming device having an image forming unit according to a third preferred embodiment of the present invention.

FIG. 11 is a timing chart showing the operation of the drive control unit 110. Here the image forming operation control signal is represented by "1" to execute an image forming operation, and "0" to terminate. The motor drive control signal MOT_DR is represented by "0" to stop the motor and "1" to drive the motor. The motor rotation direction control signal MOT_DIR is represented by "1" for the clockwise direction of the motor drive shaft 103 in FIG. 8, and "0" for counterclockwise.

Referring to FIGS. 7-9 and 11, first, when the drive control unit 110 receives from the outside an image forming command signal that instructs the start of an image forming operation, the motor drive control unit 113 of the drive control unit 110 switches the motor drive control signal MOT_DR from "0" to "1", and outputs the signal to the motor 102. Here, "the outside" of the drive control unit 110 is for example the image forming unit 121.

After the motor drive control signal MOT_DR has started and the motor rotation direction control unit 114 has received the reciprocating time Ts from the low speed rotation time determination unit 112, the motor rotation direction control unit 114 outputs a motor rotation direction control signal MOT_DIR to the motor 102. Specifically, the motor rotation direction control unit 114 periodically outputs a pulse having a predetermined period and a predetermined HIGH period. The motor rotation direction control unit 114 repeats this operation during the reciprocating time Ts determined by the low speed rotation time determination unit 112. Here, the periodically output pulse number is determined by the width of the aperture 109a formed in the fixed body 109 and the rotation speed of the motor 102 while the projecting portion 106a of the ring 106 is reciprocating within the aperture 109a. In the present embodiment, the aperture 109a has a width corresponding to a rotation angle of the motor rotation shaft 103 of about 30 or to 30 degrees in FIG. 8. Also, the rotation speed of the motor 102 while the projecting portion 106a is reciprocating within the aperture 109a is 0.2 rpm. For this case the pulse period of a motor rotation direction control signal MOT_DIR is about 90.9 ms, and the pulse number of a motor rotation direction control signal MOT_DIR is about 200.

After the motor drive control signal MOT_DR has started and the motor rotation speed control unit 115 has received the reciprocating time Ts from the low speed rotation time determination unit 112, the motor rotation speed control unit 115 outputs a motor rotation direction speed signal MOT_FCLK to the motor 102. Specifically, during the reciprocating time Ts determined by the low speed rotation time determination unit 112, the motor rotation speed control unit 115 periodically outputs a pulse having a predetermined period and a predetermined HIGH period indicating a constant rotation speed. In the present embodiment, assuming for example a motor 102 rotation speed of 0.2 rpm, the period of the motor rotation speed control signal MOT_FCLK is about 90.9 ms and the period of the HIGH of the motor rotation speed control signal MOT_FCLK is about 2 ms (duty: 2.2%).

As stated above, during the reciprocating time Ts (in other words, during the second period B), the motor 102 rotates at a low speed in the clockwise direction and in the counterclockwise direction, based on each signal sent from the motor rotation direction control unit 114 and the motor rotation speed control unit 115. Then the projecting portion 106a of the ring 106 reciprocates within the aperture 109a of the fixed body 109. The planetary rollers 104 rotate forward and back by a predetermined amount on the outer surface of the motor rotation shaft 103, with the portion in contact between the planetary rollers 104 and the outer surface of the motor rotation shaft 103 when the rotation of the motor 102 is stopped as center. In this way, the part of the elastic material 104a of the planetary rollers 104 in which elastic deformation occurred when the motor 102 was stopped recovers by being able to expand.

After the reciprocating period Ts has passed, the motor rotation direction control unit 114 and the motor rotation speed control unit 115 output signals to the motor 102 to rotate the motor 102 in one direction at a constant speed that is faster than the speed during the reciprocating time Ts. In this way, the motor 102 rotates in a direction and at a speed based on the motor rotation direction control signal MOT_DIR and the motor rotation speed control signal MOT_FCLK respectively, and the motor 102 enters the steady rotation state.

The image forming operation control unit 116 transmits an image forming operation control signal "0" to the image forming unit 121 during the time that the motor rotation speed control signal MOT_FCLK is not constant, including during the reciprocating time. When the motor rotation speed control signal MOT_FCLK becomes constant, in other words after the motor 102 is in the steady rotation state, the image forming operation control unit 116 transmits an image forming operation control signal "1" to the image forming unit 121. Then, after receiving this signal, the image forming unit 121 starts the image forming operation.

(4) Effect

According to the drive device 101 of the second embodiment, the part of the elastic material 104a of the planetary rollers 104 in which elastic deformation occurs when the motor 102 is stopped rotates forward and back on the outer surface of the motor rotation shaft 103 during the reciprocating period Ts after the motor 102 is started. Therefore the elastic material 104a is extended by the motor rotation shaft 103 and the elastic deformation recovers. Therefore, even if the image forming operation is started by the image forming unit 121, the rotation speed of the output shaft 108 of the drive device 101 is constant. Therefore, it is possible to prevent phenomena such as color distortion or color unevenness in images caused by non-uniformity of the rotation speed of the output shaft 108. Also, it is possible to suppress the occurrence of wear in the planetary rollers 104 on the contact surface of the planetary rollers 104 and the ring 106 as a result of the play in the fixed body 109 when rotating forward and back the part of the elastic material 104a in which elastic deformation occurs when the motor 102 is stopped.

Also, the drive device 101 determines the reciprocating time Ts in accordance with the temperature Te of the entire planetary roller type power transmission unit, including the temperature of the elastic material 104a of the planetary rollers 104. In this way, even though the elastic deformation recovery time varies as the temperature of the elastic material 104a of the planetary rollers 104 varies, it is possible for the drive device 101 to start the image forming operation of the image forming unit 121 after the elastic deformation has recovered.

Other Embodiments (a) In the first embodiment described above, the time between completion of an image forming operation and the start of reciprocation of the projecting portion 6a of the ring 6 within the aperture 9a of the fixed body 9, in other words the time T1, was one second. However, the projecting portion 6a may start the reciprocating motion immediately the image forming command signal that instructs the start of image forming is received by the drive control unit 10.

(b) The second embodiment was described for the case where the drive device 101 included the temperature sensor 105b and the low speed rotation time determination unit 112. However, these elements may be omitted. In this case the reciprocating time Ts is a time determined in advance. In other words, the motor rotation direction control unit 114 and the motor rotation speed control unit 115 within the drive control unit 110 control the motor 102 to reciprocate the projecting portion 106a within the aperture 109a for the predetermined reciprocating time Ts.

(c) In the second embodiment described above, the temperature sensor 105b is provided within the drive device 101. However, the temperature sensor 205b may be provided within the image forming device 251, to measure the temperature of the entire image forming unit 121. If the temperature sensor 105b is provided within the drive device 101, the number of temperature sensors 105b required is the same as the number of drive devices 101, which are provided one per photosensitive drum. However, if the temperature sensor 105b is provided for the entire image forming device 251, only one temperature sensor 105b is necessary. Therefore the cost can be reduced.

(d) In the second embodiment, an example was described where the low speed rotation time determination unit 112 determined the reciprocating time Ts based on the reciprocating time table shown in FIG. 10. However the present invention is not limited to this. The low speed rotation time determination unit 112 may determine the reciprocating time Ts based on a calculation formula to determine the reciprocating time that is independent of the temperature ranges.

(e) In the second embodiment described above, the case was described where the image forming operation control unit 116 monitored the MOT_FCLK signals output by the motor rotation speed control unit 115. However the present invention is not limited to this. The image forming operation control unit 116 may monitor the rotation speed measured by the rotation speed sensor 105a.

(f) The first and second embodiments have been described for the case where the projecting portion 6a reciprocates during the first period A or the second period B respectively. However, the projecting portion 6a may reciprocate during either the first period A or the second period B. In this case, the planetary rollers move without stopping. Therefore no elastic deformation occurs in the elastic material of the planetary rollers. Therefore the effect of the first embodiment can be further increased.

The drive device according to the present invention can be used as the drive device that drives image forming devices such as color printers or color copiers.

In other words, "means plus function" clauses as utilized in the specification and claims should include any structure or hardware and/or algorithm or software that can be utilized to carry out the function of the "means plus function" clause.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having," and their derivatives. Also, the terms "part," "section," "portion," "member," or "element" when used in the singular can have the dual meaning of a single part or a plurality of parts. As used herein to describe the present invention, the following directional terms "forward, rearward, above, downward, vertical, horizontal, below, and transverse" as well as any other similar directional terms refer to those directions of an imaging forming device equipped with the present invention. Accordingly, these terms, as utilized to describe the present invention should be interpreted relative to an imaging forming device equipped with the present invention as normally used. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A drive device that drives a rotating body in an image forming device, comprising:
    a motor having a rotation shaft;
    a planetary roller type power transmission unit having
        a plurality of planetary rollers having at least a part thereof made from an elastic material being pressed against the periphery of said motor rotation shaft,
        a ring having a projecting portion on an outer surface thereof, and an internal surface being configured to contact said plurality of planetary rollers,
        a fixed body being disposed to cover said ring and having an aperture located corresponding to said projecting portion of said ring, a width of the aperture being configured to permit said projecting portion to move a predetermined distance,
        a carrier roller being configured to rotate in conjunction with the rotation of said planetary rollers, and
        an output shaft being configured to output the rotation of said carrier roller to an image forming unit; and
    a drive control unit being configured to control the rotation of said motor being configured to drive said projecting portion to reciprocate within the aperture of said fixed body when said image forming unit is not carrying out an image forming operation.

2. The drive device according to claim 1, wherein said drive control unit controls the rotation of said motor so that said projecting portion of said ring reciprocates within the aperture of said fixed body during a first period from receipt of a signal indicating completion of an image forming operation until receipt of a signal instructing the start of the next image forming operation.

3. The drive device according to claim 2, wherein during said first period, said drive control unit further controls the rotation of said motor so that said carrier roller is rotated through a predetermined angle at first predetermined time intervals.

4. The drive device according to claim 2, wherein said drive control unit further controls the rotation of said motor so that after said projecting portion of said ring has contacted an inner wall of the aperture of said fixed body, the motor is rotated at a predetermined speed.

5. The drive device according to claim 1, wherein during a second period from the start up of said motor until a second predetermined period of time has passed, said drive control unit controls the rotation of said motor so that said projecting portion of said ring reciprocates within the aperture of said fixed body.

6. The drive device according to claim 5, further comprising a measurement unit that measures the temperature of said planetary rollers or the temperature near said planetary rollers, wherein said drive control unit further includes a second predetermined time determination unit that determines a second predetermined time based on the temperature measured by said measurement unit, and an image forming operation control unit that starts image forming operations in said image forming unit after at least said second predetermined time has passed since the start up of said motor.

7. The drive device according to claim 5, wherein said drive control unit further controls the rotation of said motor so that said planetary rollers revolve forwards and back by a predetermined amount on an outer surface of said motor rotation shaft with a part of said planetary rollers that has been in contact with said outer surface of said motor rotation shaft when said motor has stopped in the center.

8. An image forming device comprising:
    an image forming unit having at least one photosensitive drum;
    a measurement unit being configured to measure temperature; and
    a drive device being configured to drive said photosensitive drum, said drive device having,
        a motor having a rotation shaft,
        a planetary roller type power transmission unit having
            a plurality of planetary rollers having at least a part thereof made from an elastic material being pressed against the periphery of said motor rotation shaft,
            a ring having a projecting portion on an outer surface thereof, and an internal surface being configured to contact said plurality of planetary rollers,
            a fixed body being disposed to cover said ring and having an aperture located corresponding to said projecting portion of said ring, a width of the aperture being configured to permit said projecting portion to move a predetermined distance,
            a carrier roller being configured to rotate in conjunction with the rotation of said planetary rollers, and
            an output shaft being configured to output the rotation of said carrier roller to an image forming unit, and
        a drive control unit being configured to control the rotation of said motor being configured to drive said projecting portion to reciprocate within the aperture of said fixed body when said image forming unit is not carrying out an image forming operation.

9. The image forming device according to claim 8, wherein said drive control unit controls the rotation of said motor so that said projecting portion of said ring reciprocates within the aperture of said fixed body during a first period from receipt of a signal indicating completion of an image forming operation until receipt of a signal instructing the start of the next image forming operation.

10. The image forming device according to claim 9, wherein during said first period, said drive control unit further controls the rotation of said motor so that said carrier roller is rotated through a predetermined angle at first predetermined time intervals.

11. The image forming device according to claim 9, wherein said drive control unit further controls the rotation of said motor so that after said projecting portion of said ring has contacted an inner wall of the aperture of said fixed body, the motor is rotated at a predetermined speed.

12. The image forming device according to claim 8, wherein during a second period from the start up of said motor until a second predetermined period of time has passed, said drive control unit controls the rotation of said motor so that said projecting portion of said ring reciprocates within the aperture of said fixed body.

13. The image forming device according to claim 12, further comprising a measurement unit arranged in said drive device that measures the temperature of said planetary rollers or the temperature near said planetary rollers, wherein said drive control unit further includes a second predetermined time determination unit that determines a second predetermined time based on the temperature measured by said measurement unit, and an image forming operation control unit that starts image forming operations in said image forming unit after at least said second predetermined time has passed since the start up of said motor.

14. The image forming device according to claim 12, wherein said drive control unit further controls the rotation of said motor so that said planetary rollers revolve forwards and back by a predetermined amount on an outer surface of said motor rotation shaft with a part of said planetary rollers that has been in contact with said outer surface of said motor rotation shaft when said motor has stopped in the center.

15. The image forming device according to claim 12, further comprising a measurement unit arranged outside said drive device that measures the temperature of said image forming unit, wherein said drive control unit further includes a second predetermined time determination unit that determines a second predetermined time based on the temperature measured by said measurement unit, and an image forming operation control unit that starts image forming operations in said image forming unit after at least said second predetermined time has passed since the start up of said motor.

* * * * *